United States Patent [19]
Burns et al.

[11] Patent Number: 5,973,026
[45] Date of Patent: Oct. 26, 1999

[54] INK JET INKS

[75] Inventors: Patricia A. Burns, Milton; Marcel P. Breton, Mississauga; Yvan Gagnon, Mississauga; David N. MacKinnon, Mississauga, all of Canada

[73] Assignee: Xerox Corporation, Stamford, Conn.

[21] Appl. No.: 09/017,533

[22] Filed: Feb. 2, 1998

[51] Int. Cl.$^6$ .......................... C09D 11/00; C09D 11/02
[52] U.S. Cl. ................ 523/160; 106/31.6; 106/31.75
[58] Field of Search ............................ 523/160, 161; 106/31.6, 31.75

[56] References Cited

U.S. PATENT DOCUMENTS

| | | | |
|---|---|---|---|
| 4,251,824 | 2/1981 | Hara et al. | 346/140 R |
| 4,463,359 | 7/1984 | Ayata et al. | 346/1.1 |
| 4,532,530 | 7/1985 | Hawkins | 346/140 R |
| 4,597,794 | 7/1986 | Ohta et al. | 106/20 |
| 4,601,777 | 7/1986 | Hawkins et al. | 156/326 |
| 4,627,875 | 12/1986 | Kobayashi et al. | 106/22 |
| 4,659,383 | 4/1987 | Lin et al. | 106/27 |
| 4,680,332 | 7/1987 | Hair et al. | 524/337 |
| 4,705,567 | 11/1987 | Hair et al. | 106/20 |
| 4,737,190 | 4/1988 | Shimada et al. | 106/22 |
| 4,840,674 | 6/1989 | Schwarz | 106/22 |
| 4,853,036 | 8/1989 | Koike et al. | 106/20 |
| 4,877,451 | 10/1989 | Winnik et al. | 106/23 |
| 4,996,252 | 2/1991 | Phan et al. | 524/88 |
| 5,006,598 | 4/1991 | Adams et al. | 524/601 |
| 5,021,802 | 6/1991 | Allred | 346/1.1 |
| 5,041,161 | 8/1991 | Cooke et al. | 106/22 |
| 5,043,084 | 8/1991 | Guiterrez et al. | 252/47 |
| 5,065,167 | 11/1991 | You et al. | 346/1.1 |
| 5,124,718 | 6/1992 | Koike et al. | 346/1.1 |
| 5,156,676 | 10/1992 | Breton et al. | 106/22 |
| 5,169,437 | 12/1992 | You | 106/20 D |
| 5,207,824 | 5/1993 | Moffatt et al. | 106/22 R |
| 5,324,349 | 6/1994 | Sano et al. | 106/25 R |
| 5,348,832 | 9/1994 | Sacripante et al. | 430/109 |
| 5,364,462 | 11/1994 | Crystal et al. | 106/22 R |
| 5,385,957 | 1/1995 | Tobias et al. | 523/161 |
| 5,523,335 | 6/1996 | Whyzmuzis et al. | 523/160 |
| 5,604,076 | 2/1997 | Patel et al. | 430/137 |
| 5,648,193 | 7/1997 | Patel et al. | 430/137 |
| 5,658,704 | 8/1997 | Patel et al. | 430/137 |
| 5,662,734 | 9/1997 | Crystal | 106/31.75 |
| 5,679,724 | 10/1997 | Sacripante et al. | 523/161 |
| 5,684,063 | 11/1997 | Patel et al. | 523/161 |
| 5,762,695 | 6/1998 | Wong et al. | 106/31.89 |
| 5,772,746 | 6/1998 | Sawada et al. | 106/31.86 |

*Primary Examiner*—Vasu Jagannathan
*Assistant Examiner*—Callie E. Shosho
*Attorney, Agent, or Firm*—E. O. Palazzo

[57] ABSTRACT

An aqueous ink composition containing polymer, colorant, and zwitterionic component.

32 Claims, No Drawings

INK JET INKS

PENDING PATENT APPLICATIONS AND PATENTS

The following applications, the disclosures of each being totally incorporated herein by reference, are being filed concurrently herewith.

U.S. Ser. No. 09/017,459 relating to an ink containing a colorant, polymer, such as a dissipatible polymer, vehicle, and a salt of polyacrylic, a salt of polyamic acid, a salt of alginic acid, or mixtures thereof;

U.S. Ser. No. 09/017,537 relating to an ink containing a resin of a dissipatible sulfonated polyester terminated with acrylic or methacrylic acid groups;

U.S. Ser. No. 09/017,072 relating to an ink containing a mixture of two black colorants, betaine, and N,N'-bis(3-aminopropyl) ethylenediamine; and U.S. Ser. No. U.S. Pat. No. 5,837,043 relating to an ink containing a perfluoro surfactant additive.

Also, illustrated in U.S. Pat. No. 5,684,063, the disclosure of which is totally incorporated herein by reference, is a process for the preparation of inks comprised of:

i) flushing pigment into a sulfonated polyester resin, and which resin possesses a degree of sulfonation of from between about 2.5 and about 20 mol percent;

ii) dispersing the pigmented polyester resin in water at a temperature of from about 40° C. about 95° C. by a polytron shearing device operating at speeds of from about 100 to about 5,000 revolutions to yield stable pigmented submicron sized particles of from about 5 to about 150 nanometers; and thereafter separating said submicron particles and mixing the submicron particles with water. Also, certain inks with sulfo-polyester resins are illustrated in U.S. Pat. No. 5,658,704, U.S. Pat. No. 5,648,193, and U.S. Pat. No. 5,684,063, the disclosures of each being totally incorporated herein by reference.

The sulfonated polyesters of the above applications, and patents and other appropriate ink components thereof, can be selected for the inks of the present invention, and preferably the ink polymers of the present invention are the sulfo-polyesters as illustrated in the above copending applications and patents. Moreover, there can be selected for incorporation into the inks of the present invention polyhydroxyalcohol surfactants, reference for example the polyhydroxyalcohol surfactants of U.S. Pat. No. 5,837,043, the disclosure of which is totally incorporated herein by reference.

The appropriate components and processes of the above applications and patents may be selected for the present invention in embodiments thereof.

BACKGROUND OF THE INVENTION

The present invention is generally directed to inks, and more specifically to thermal ink jet inks and processes thereof. In embodiments, the present invention is directed to inks containing a dissipatible polymer and a zwitterionic additive, such as betaine, and which inks possess a number of advantages, such as reduced or minimal smear without for example, heating, increased paper latitude, reduced cool, or room temperature paper curl, and the like. The inks of the present invention in embodiments also possess excellent waterfastness, superior smear resistance, and high optical densities of for example from about 1.4 to about 1.6 as measured using a MacBeth or X-Rit densitometer compared to some other inks without betaine wherein the optical density thereof is from about 1.2 to about 1.3. The present invention in embodiments thereof enables the utilization of polymers obtained by polycondensation reactions, such as polyesters, and more specifically, the sulfonated polyesters as illustrated in U.S. Pat. No. 5,348,832, and U.S. Pat. No. 5,604,076, the disclosures of which are totally incorporated herein by reference. Sulfopolyester resins which can be selected for the invention inks, are known and are generally available commercially from Eastek Inks, a business unit of Eastman Chemical Company. These sulfopolyester resins are suitable for use in overprint lacquers and primers, as described in Kenneth R. Barton, "Sulfopolyesters: New Resins for Water-Based Inks, Overprint Lacquers and Primers", *American Ink Maker*, pp. 70–72 (October, 1993).

Thermal ink jet printing processes, and which processes may be selected for the inks of the present invention, are described in more detail, for example, in U.S. Pat. Nos. 5,169,437 and 5,207,824, the disclosures of which are totally incorporated herein by reference.

PRIOR ART

Various inks for ink jet printing processes are known. For example, ink jet inks are disclosed in U.S. Pat. Nos. 4,737,190 and 5,156,675. Generally, the ink jet inks of the prior art are aqueous inks comprising a major amount of water, a humectant, a cosolvent, and a dye. By selecting specific humectants, dyes, or other components, the print characteristics of the resultant ink can be modified Ink jet printing systems can generally be classified as continuous stream and drop-on-demand. In drop-on-demand systems, a droplet is ejected from an orifice directly to a position on a recording medium in accordance with digital data signals. A droplet is not usually formed or expelled unless it is to be placed on the recording medium. A second type of drop-on-demand system is known as thermal ink jet, or bubble jet. With this type, there are apparently generated high velocity droplets and there is allowed very close spacing of the nozzles. Thermal ink jet processes are described, for example, in U.S. Pat. Nos. 4,601,777; 4,251,824; 4,410,899; 4,412,224 and 4,532,530, the disclosures of each of which are totally incorporated herein by reference.

Known ink jet inks generally comprise a water soluble dye which is soluble in an ink vehicle such as water or a mixture comprising water and a known water soluble or water miscible organic solvent. Inks comprising these soluble dyes may exhibit many problems, such as poor waterfastness, poor lightfastness, clogging of the jetting channels as a result of solvent evaporation and changes in the solubility of the dye, dye crystallization, ink bleeding when prints are formed on plain papers, poor thermal stability, chemical instability, ease of oxidation, and low drop velocity. In addition, a number of the known dyes contained in inks may be potentially toxic or mutagenic.

Heterophase ink jet inks are also known. For example, U.S. Pat. No. 4,705,567, the disclosure of which is totally incorporated herein by reference, discloses a heterophase ink jet ink composition which comprises water and a dye covalently attached to a component selected from the group consisting of poly(ethylene glycols) and poly(ethylene imines), which component is complexed with a heteropolyanion. In addition, U.S. Pat. No. 4,597,794 discloses an ink jet recording process which comprises forming droplets of an ink and recording on an image receiving with ink droplets, wherein the ink is prepared by dispersing fine particles of a pigment into an aqueous dispersion medium containing a polymer having both a hydrophilic and a hydrophobic portion. The hydrophilic portion is comprised of a polymer obtained from monomers with mainly polymerizable vinyl groups into which hydrophilic portions such as sulfonic acid groups, sulfate groups, and the like are introduced. Ink pigment particle size may be from several microns to several hundred microns.

U.S. Pat. No. 4,877,451, the disclosure of which is totally incorporated herein by reference, discloses ink jet ink compositions comprising water, a solvent, and a plurality of colored particles comprising hydrophilic porous silica particles to the surfaces of which dyes are covalently bonded through silane coupling agents.

In an acoustic or piezoelectric ink jet system, ink droplets are propelled to the recording medium by means of a piezoelectric oscillator. In such a system, a recording signal is applied to a recording head containing the piezoelectric oscillator, causing droplets of the ink to be generated and subsequently expelled through the printhead in response to the recording signal to generate an image on the recording medium. In this printing system, a recording signal is converted into a pulse by a signal processing means, such as a pulse converter, and then applied to the piezoelectric oscillator. A change in pressure on the ink within an ink chamber in the printhead caused by the recording signal results in droplets of ink being ejected through an orifice to a recording medium Such an ink jet system is described in more detail, for example, in U.S. Pat. No. 4,627,875, the disclosure of which is totally incorporated herein by reference. In these and other similar ink jet recording processes, it is important that the ideal ink being used satisify a number of performance characteristics, and which characteristics are generally more stringent than those for other liquid ink applications, such as for writing instruments like a fountain pen, felt pen, and the like.

Various inks for ink jet printing processes are known, for example, various ink jet inks are disclosed in U.S. Pat. Nos. 4,737,190 and 5,156,675. Generally, the ink jet inks of the prior art are aqueous inks comprising a major amount of water, a humectant and/or a cosolvent, and a water soluble dye. By selecting specific humectants, dyes, or other components, it is possible to adjust the print characteristics of the resultant ink.

U.S. Pat. No. 5,364,462, the disclosure of which is totally incorporated herein by reference, describes dye-based inks that are described as providing improved stability, jetting characteristics, solubility and waterfastness. The aqueous dye-based ink includes a dye and a hydroxyethylated polyethylene imine polymer. The hydroxyethylated polyethylene imine polymer may also be substituted with hydroxypropylated polyethylene imine or epichlorohydrin-modified polyethylene imine polymers. Aprotic solvents, such as dimethyl sulfoxide and tetramethylene sulfone, may also be added to the ink to improve the solubility and stability of the dye solution.

SUMMARY OF THE INVENTION

A need continues to exist for improved inks, and more specifically inks that provide high quality prints on a wide variety of recording media, including plain paper, and wherein there is improved smear, reduced or minimal paper curl, and the like. Although a number of currently available ink jet inks may provide waterfast images with substrate latitude, the inks may be unacceptable in that they generally smear and have poor latency and maintainability characteristics. In addition, such inks are generally difficult to manufacture. Thus, there remains a need for improved black and colored inks that can be easily prepared and can be obtained at a lower cost. There also remains a need for inks with high optical densities. These and other needs may be achievable with the inks of the present invention in embodiments thereof.

The present invention provides inks, and processes for generating ink jet ink compositions that have excellent waterfastness, excellent high optical densities, and high print quality on a wide variety of print media, including paper and transparencies, reduced paper curl, improved smear characteristics, and the like.

In embodiments, the present invention relates to inks and to processes for the preparation thereof, which inks are comprised of water, known optional ink additives, an optional cosolvent, and resin, or polymer, especially a dissipatible sulfopolyester, colorant, such as pigment, dye, or mixtures thereof, and a betaine; an aqueous ink composition comprised of polymer, colorant, and zwitterionic component; an ink comprised of water, colorant, dissipatible polymer, and a zwitterionic component of betaine; an ink further containing a polyhydroxyalcohol surfactant; an ink wherein the colorant is a pigment, or a dye; an ink wherein said betaine is present in said ink in an amount of from about 2 to about 35 weight percent; an ink wherein said betaine is present in said ink in an amount of from about 3 to about 20 weight percent; an ink wherein said polymer is a dissipatible polymer of a sulfonated polyester; an ink wherein the colorant is present in an amount of about 1 to about 20 percent, the dissipatible polymer is present in an amount of about 0.1 to about 20 percent, and water is present in an amount of from about 96 to about 40 percent by weight based on the total of all ink components; an ink wherein the colorant is present in an amount of about 1 to about 10 percent and the dissipatible polymer is present in an amount of about 10 to about 50 percent based on the amount of colorant present in the ink; an ink wherein there is further included therein a cosolvent; an ink wherein the cosolvent is sulfolane; an ink wherein the polymer is a sulphonated polyester with a sulphonation level, or amount of about 5 to about 20 percent; an ink wherein the polymer is a sulphonated polyester with a sulphonation amount of about 8 to about 15 percent; an 2 further containing ink additives; an ink where the additives are a biocide, a humectant, or mixtures thereof; an ink wherein each additive is selected in an amount of form about 1 to about 5 weight percent based on the total amount of the components in the ink; an ink wherein the polyhydroxyalcohol is a polyethylene glycol tetramethyl decynediol and wherein the polyethylene glycol portion contains about 30 units of ethylene oxide; an ink wherein said polymer is a polyester, a styrene, a polystyrene/acrylate, or a polystyrene/methacrylate; an ink wherein the colorant is a pigment of carbon black; an ink wherein the polymer is a sulfopolyester oligomer with a weight average molecular weight of from about 1,000 to about 10,000; an ink wherein the polymer is the sulfopolyester copoly(1,2-propylene-diethylene)terephthalate-copoly(sodium sulfoisophthalate) dicarboxylate; a printing process which comprises (1) incorporating into an ink jet printing apparatus the invention ink composition, and (2) causing droplets of the ink to be ejected in an image wise pattern onto a substrate, thereby generating images on the substrate; a printing process wherein the ink jet printing apparatus employs a thermal ink jet printing process, and wherein there are provided prints on paper with solid area coverage with an optical density of from about 5 to about 1.5, wherein the prints possess a waterfastness of from about 80 percent to about 99 percent and which prints possess minimum curl and minimal smear; an ink wherein there is selected a zwitterionic component of the formula $R_3N^+(CH_2)_nCOO^-$ wherein n represents the number of segments, such as from about 1 to about 25, and preferably from 1 to about 10, and more preferably from 1 to 4, and R is a hydrocarbon; a process for reducing image smearing and minimizing paper curl in an ink jet printing apparatus which process comprises selecting an ink containing a betaine.

The vehicle for the inks of the present invention can be comprised of various known components, such as water, a mixture of water and a miscible organic component, such as a glycol, like ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones; biocides; other water miscible materials, mixtures thereof; and the like. When mixtures of water and water miscible organic liquids, such as glycols, are selected as the liquid vehicle, the water to organic ratio may be in any effective range, and typically is from about 100:0 to about 30:70, and preferably from about 97:3 to about 50:50. The nonwater or organic component of the liquid vehicle generally serves as a humectant which has a boiling point higher than that of water (100° C.). The ink liquid vehicle components, that is for example the water, the humectants, and the like generally possess absorption characteristics on paper and evaporation properties allowing for the desired ink jet printing speed when the ink is to be used in an ink jet printing process. With the inks of the present invention, in embodiments the liquid vehicle can be present in an amount of from about 50 to about 99.5 percent by weight, and preferably from about 75 to about 99 percent by weight, or parts, with the total of all ink components being equal to about 100 percent, or parts.

Of importance with respect to the inks of the present invention is the presence of the dissipatible polymer and a zwitterionic component, especially betaine, and which component is present in the ink in various effective amounts, for example from about 1 to about 35, from about 2 to about 25 weight percent, and preferably from about 2.5 to about 5 weight percent based on the total of all ink components, that is water, colorant, polymer, humectant and optional components when present such as a biocide, a buffer and a cosolvent and wherein the total of all ink componets is about 100 percent, or 100 parts.

The zwitterionic compound, or component can be selected in various suitable amounts, such as from about 2 to about 30, and preferably from about 2 to about 5 weight percent, and may be represented by the formula $R_3N^+(CH2)_nCOO^-$ wherein n represents the number of segments, and is preferably a number of from 1 to 4, and R is a hydrocarbon, such as for example, with 1 to about 20 carbon atoms, like, $CH_3$ to $C_{18}H_{38}$, or halogenated hydrocarbons thereof. The hydrocarbon chains may contain a different number of carbons and preferably one of the R groups is methyl. Specifically, when is $R=CH_3$— and n=1, this compound is known as betaine, an inner salt ofmethanaminium, 1-carboxy-N,N,N-trimethyl. Other preferred zwitterionic compounds include inner salts of ethanaminium, 2-carboxy-N,N-diethyl-N-methyl—, of 1-propanaminium, 3-carboxy-N,N,N-trimethyl—, of 1-butanaminium, 4-carboxy-N,N,N-trimethyl—, 1-propanaminium, 3-carboxy-N, N-diethyl-N-methyl—, of methanaminium, 1-carboxy-N,N-dimethyl-N-trifluoromethyl, of methanaminium, 1-carboxy-N,N-dimethyl-N-(ethylene oxide)— oxide)- and mixtures thereof with, for example, one of the following compounds:butanedioic acid, 2-aminothane sulfonic acid, L-glutamine and urea. The preferred amount of inner salt in the mixture is for example, from about 20 to about 100 percent by weight and preferably from about 50 to about 100 percent by weight.

Optional additives can also be present in the inks of the present invention as indicated herein. For example, one or more surfactants, wetting or dispersing agents can be added to the ink. These additives may be of the cationic, anionic, amphoteric, or nonionic types. Suitable surfactants and wetting or dispersing agents include TAMOL® SN, TAMOL® LG, those of the TRITON® series available from Rohm and Haas Company, those of the MARASPERSE® series, those of the IGEPAL® series available from GAF Company, those of the TERGITOL® series, STRODEX PK-90™ available from GAF, PLURONIC F68™ available from BASF, KARASPERSE TU™ available from Marasperse, and other commercially available surfactants. These surfactants and wetting agents are present in any effective amounts, generally from 0 to about 15 percent by weight, and preferably from about 0.01 to about 8 percent by weight.

Additives or dispersants in effective amounts of, for example, 1 to about 15 weight percent primarily for enhancing the viscosity of the ink can also be added to the inks of the present invention. Examples include water soluble polymers, such as gum arabic, polyacrylate salts, polymethacrylate salts, polyvinyl alcohols, hydroxypropylcellulose, hydroxyethylcellulose, polyvinylpyrrolidinone, polyvinylether, starch, polysaccharides, the sodium salt of naphthalene sulfonate formaldehyde copolymer, the sodium salt of alkylbenzene sulfonate, the sodium salt of dialkylsulfosuccinate, the sodium salt of lignosulfonate, the sodium alkylene oxide copolymer, sodium salt of alkyletherphosphate, and the like. In addition, polymers such as hydroxypropylpolyethyleneimine (HPPEI-200) or other polyethyleneimine derivatives can be added to the ink in amounts ranging from 0.01 to 10 percent by weight and preferably from 0.01 to 5 percent by weight based on the total of all ink components.

Optional additives for further improving the jetting characteristics and the storage stability of the inks, and for preventing undesirable interactions of the inks with the printhead either during the jetting process or while the printer is idle for the inks of the present invention as illustrated herein, include humectants such as ethylene glycol, diethylene glycol, N-methylpyrrolidinone, 2-pyrrolidinone, propylene glycol, hydroxyethers, ethers, amides, sulfoxides, ketones, lactones, esters, alcohols, and the like, each present in an amount of from 0 to about 50 percent by weight, and preferably from about 5 to about 40 percent by weight; biocides like DOWICIL™ 75, 150, and 200, benzoate salts, sorbate salts, and the like, present in an effective amount of, for example, from about 0.0001 to about 4 percent by weight, and preferably from about 0.01 to about 2.0 percent by weight; and pH controlling agents, such as acids or bases, phosphate salts, carboxylate salts, sulfite salts, amine salts, and the like, present in an amount of from 0 to about 5 percent by weight and preferably from about 0.01 to about 2 percent by weight, bases present in an amount of from 0 to about 10 percent by weight and preferably from about 4 to about 8 percent by weight, or the like. Penetration control additives such as N-methylpyrrolidinone, sulfoxides, ketones, lactones, esters, alcohols, butyl carbitol, benzyl alcohol, cyclohexylpyrrolidinone, 1,2-hexanediol, and the like, present in an amount of from 0 to about 50 percent by weight, and preferably from about 5 to about 40 percent by weight, although the amount may be outside these ranges and the like. Other examples of suitable ink additives include those illustrated in U.S. Pat. No. 5,223,026 and U.S. Pat. No. 5,207,825, the disclosure of each of which is totally incorporated herein by reference. The percent by weight of the additives above are based on the total amount of the components in the ink, and which total is about 100 percent, or 100 parts.

Examples of polymers that can be selected for the inks of the present invention include for example, polyesters, polystyrene/acrylates, sulphonated polyesters, reference the pending applications and patents mentioned herein, polyurethanes, polyimides and the like and preferably sulfonated polyesters. The sulfonated polyester may be selected from copoly(1,2 propylene-diethylene)terephthalate-copoly (sodium sulfoisophthalate dicarboxylate), a copoly(1,2 propylene-diethylene) isophthalate-copoly(sodium sulfoisophthalate dicarboxylate), a copoly(1,2 propylene-diethylene)isophthalate-copoly(sodium sulfophthalate dicarboxylate), a copoly(1,2 propylene-diethylene) phthalate-copoly(sodium sulfoisophthalate dicarboxylate), and the sulfonated polyesters of copending application U. S. Ser. No. 09/017,537, the disclosure of which is totally incorporated herein by reference. The sulfonated moiety may be a sodium sulfonate, a potassium sulfonate, a lithium sulfonate, a calcium sulfonate. The hydrophilic group can be a carboxylic acid alkali salt, a phosphonate salt or an ammonium halide group. Preferably, the polymers which are water soluble or water dissipatible are present in amounts of from about 0.01 to about 15 percent by weight and more preferably from about 0.01 to about 5 percent by weight based on the total amount of components in the ink.

Also, in embodiments there may be selected as the ink polymer a sulfopolyester urethane illustrated in copending application U.S. Pat. No. 5,786,412, the disclosure of which is totally incorporated herein by reference. The polymers can be selected in various suitable amounts to for example, assist in controlling the rheological properties and the smear properties of the inks. Preferably, the polymers which are water soluble or water dissipatible are present in amounts of from about 0.01 to about 5 percent by weight and more preferably from about 0.01 to about 3 percent by weight.

Examples of suitable colorants, include dyes like reactive dyes, direct dyes, anionic dyes, acid dyes, food dyes, and the like. Specific examples of suitable dyes include mixtures of the ProJet dyes available from Zeneca (ICI) such as ProJet Fast Magenta 2, ProJet Fast Black 2 ProJet Fast Yellow 2, ProJet Fast Cyan 2, and ProJet Fast Black 2-CF1 with less waterfast dyes such as ProJet Yellow 1 G, ProJet Yellow OAM, ProJet Cyan 1, ProJet Magenta 3B-OA, ProJet Magenta 1T, ProJet Magenta 1, and ProJet Black OA-PZ,. Other dyes are also suitable for the embodiments of this invention: Basacid Black X-34, available from BASF, Carta Black 2GT, available from Sandoz Inc., Duasyn Acid Blue AE-SF, available from Hoechst, Duasyn Direct Turquoise Blue FRL-SF available from Hoechst, Duasyn Yellow R-GL, available from Hoechst, Bayscript Yellow GGN, available from Bayer, Pontamine Brillant Flavine 6G-N, available from Bayer, Bayscript Magenta WDP, available from Bayer, Duasyn Acid Rhodamine BSF, available from Hoechst, Bayscript Yellow BR, available from Bayer, Bayscript Cyan BA Liquid, available from Bayer, Special Black HF Liquid, available from Bayer, Special Yellow CA51089FW, available from Bayer, Acid Yellow 17, available from Tricon, and the like.

The colorant for the ink compositions of the present invention is in embodiments preferably a pigment, or a mixture of one or more pigments. The pigment can be black, cyan, magenta, yellow, red, blue, green, brown, mixtures thereof, and the like, and is preferably the carbon black Levanyl carbon black obtained from Bayer. Examples of suitable black pigments include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone, identified in the Color Index as CI 60710, CI Solvent Red 19, and the like. Illustrative examples of suitable cyan pigments include copper tetra-4-(octadecyl sulfonamido) phthalocyanine, X-copper phthalocyanine pigment, listed in the color index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy aceto-acetanilide, Permanent Yellow FGL, and the like. The preferable pigment dispersions include carbon blacks, such as Hostafine Black (T and TS), Sunsperse 9303, and Levanyl Black A-SF. Of these, Levanyl Black A-SF is the most preferred.

Preferably, the colorant, like pigment particle size is small to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.01 to about 3 microns, although the particle size can be outside these ranges. A preferred pigment particle size includes particles having at least 70 percent of the particles being below about 0.1 micron with no particles being greater than about 1.0 micron as measured on a Hodaka CAPA 700 Particle Size Analyzer. More preferably, the pigment particle size includes particles having at least 90 percent of the pigment particles being below 0.1 microns with substantially no pigment particles being greater than about 1.0 micron.

The colorant, such as pigment is present in the ink composition in various effective amounts and generally is present in an amount of from about 1 to about 20 percent by weight, preferably from about 3 to about 10 percent by weight, more preferably from about 4 to about 9 percent by weight and most preferably in embodiments from about 5 to about 8 percent, although the amounts may be outside of these ranges.

Additional colorants, that is for example second colorants primarily functioning to improve the optical density and waterfastness of prints, and improve the color space may be included in the invention inks. This colorant may be present in amounts ranging from about 0 to about 5 percent by weight, preferably from about 0 to about 3 percent by weight. Examples of such second colorants, include dyes of Polyester Yellow, Blue 590, Red 420, Napthol Blue Black, Napthol Green B, Napthol Yellow S, Naphthyl Red hydrochloride Disperse Blue 1, Disperse Blue 3, Disperse Blue 14, Disperse Orange 1, Disperse Orange 3, Disperse Orange 13, Disperse Orange 25, Disperse Red 1, Disperse Red 13, Disperse Yellow 3, Disperse Yellow 7, Disperse Yellow 9, Sudan 1 Yellow, Sudan II Orange, Sudan III Red, Sudan IV Red, Sudan Black B, Sudan Blue 1, Sudan Blue II, Sudan Orange G, or Sudan Red 7B, and the like, such as other dyes recited herein.

Colorant includes for example pigment, dye, mixtures thereof, mixtures of pigments, mixtures of dyes, and the like.

Examples of ink surfactants include the alcohol surfactants illustrated herein and more specifically a mixture of secondary alcohols reacted with ethylene oxide in which the secondary alcohols contain for example between about 11 and about 15 carbons, and wherein the secondary alcohol based surfactant is of the Tergitol 15-S series surfactants available from Union Carbide. Examples of secondary alcohol surfactants include those of the general formula $C_{11-15}$ $H_{23-31}$ $O[CH_2CH_2O]_xH$, wherein x represents a suitable number and which suerfactants include: 1) Tergitol 15-S40 surfactant with a degree of ethoxylation (mole/mole, avg) of 41.1, a calculated HLB value of 18.0 and a molecular weight in the range of about 1,800–2,100; 2) Tergitol 15-S-30 surfactant with a degree of ethoxylation (mole/mole, avg) of 31.0, a calculated HLB value of 17.5 and a molecular weight in the range of about 1,440 to 1,640; 3) Tergitol 15-S-20 surfactant with a degree of ethoxylation (mole/mole, avg) of 20.1, a calculated HLB value of 16.4 and a molecular weight in the range of about 1,020–1,150; 4) the Tergitol 15-S-15 surfactant with a degree of ethoxylation (mole/mole, avg) of 15.5, a calculated HLB value of 15.6 and a molecular weight in the range of about 850–920; 5) Tergitol 15-S-9 surfactant with a degree of ethoxylation (mole/mole, avg) of 8.9, a calculated HLB value of 13.3 and a calculated molecular weight in the range of about 584. These surfactants have excellent solubility in water and their cloud point (1% solution) is for example above about 60° C. With cosolvents such as sulfolane, thiodiglycol, and the like, the cosolvents can be selected in concentrations, or amounts ranging from about 0.001 to about 10.0 weight percent and preferably about 0.0056, 0.018, 0.028, 0.071 and 0.22 weight percent to about 8 weight percent of surfactant such as Tergitol 15-S-9, 15-S-15, 15-S-20, 15-S-30, 15-S40 respectively. The lower effective concentrations correspond to the critical micelle concentrations of the selected surfactants. The surfactants are preferably used in the absence of conventional penetrants such as butyl carbytol, cyclohexylpyrrolidinone, and low molecular weight alcohols such as methanol, ethanol, propanol, butanol and isopropanol for optimum print quality, that is excellent optical density, edge raggedness at drytime of less than about 10 seconds. Other Tergitol surfactants can also be selected in combination with the aforementioned surfactants, such as for example Tergitol 15-S-3, HLB=8.3; 15-S-5, HLB=10.6; and 15-S-7, HLB=12.4. The weight percent of each surfactant in the mixture is selected so as to satisfy primarily two conditions: 1) HLB effectiveness: weight percent of surfactant A times the HLB of surfactant A+weight percent of surfactant B times the HLB of surfactant B>13; and 2) the surfactant mixture is to remain soluble in the ink up to a temperature of 60 degree Centigrade. Further surfactant examples include the polyhydroxy alcohol surfactants such as the PEG 1540 monolaurate, the PEG 1000 monoricinoleate, the PEG 75 lanolin alcohol ether, the PEG 6000 monooleate, the PEG 200 castor oil (also available under the name Mapeg CO-200, PPG/Speciality Chem.) and more specifically the Surfynol 485, a PEG-30 tetramethyl decynediol available from Air Products and Chem., and Solan E, a polyethylene glycol (75) lanolin available from Croda, Parsippany and which surfactants are present in amounts for example, of from 0.01 to about 7 weight percent or parts based on the total ink components.

The PEG 1540 monolaurate has a HLB value of about 17; the PEG 1000 monoricinoleate, a value of 17.5; the PEG 75 lanolin alcohol ether, a value of about 16; the PEG 6000 monooleate, a value of 19; the PEG 200 castor oil, a value of 18.1; the Surfynol 485, a value of 17; and the Solan E, a value of 15. Other commercial surfactants are also suitable. These are, for example, the Atlas G-1288 (ICI Surf. Belgium), a PEG triglyceride with an HLB value of 16.0; the Atlas G-1295 (ICI Surf. Belgium), a PEG triglyceride with an HLB value of 17.5; the Atlas G-1649 (ICI Am.), a PEG alkyl aryl ether with an HLB value of 16.0; the Altas G-2151 (ICI Am.), a PEG-30 stearate with an HLB value of 16.0; the Atlas G2162 (ICI Am.), a PEG-25 propylene glycol stearate with an HLB value of 16.0; the Atlas G-3780A (ICI Am.), a PEG-20 tallow amine with an HLB value of 15.5; the Renex 720 (ICI Am.), a PEG-20 syn. primary C13–15 alcohol with an HLB value of 16.2; the Mapeg 1000 MS (PPG/Speciality Chem.), a PEG-20 stearate with HLB value of 15.7; the Nissan Nonion DS-60HN (Nippon Oils & Fats), a PEG distearate of HLB value of 19.0; the Nissan Nonion E-230, a PEG oleyl ether with an HLB value of 16.6; the Nissan Nonion HS-220 (Nippon Oils & Fats), a PEG octylphenyl ether with an HLB value of 16.2; the Nissan Nonion HS-240 (Nippon Oils & Fats), a PEG40 octylphenyl ether with an HLB value of 17.9; the Nissan Nonion HS-270 (Nippon Oils & Fats), a PEG-70 octylphenyl ether with an HLB value of 18.7.

Polymeric additives which can also be added to the ink primarily to enhance the viscosity of the ink, which additives include water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethyleneimines derivatized with polyethylene oxide and polypropylene oxide, such as the DISCOLE® series available from DKS International, Tokyo, Japan, the JEFFAMINE® series available from Texaco, Bellaire, Tex., and the like. The polymeric additives may be present in the ink in amounts of for example, from 0 to about 10 percent by weight, preferably from about 0.001 to about 8 percent by weight, and more preferably from about 0.01 to about 5 percent by weight, although the amounts may be outside these ranges.

The ink compositions of the present invention which can be prepared by mixing the components thereof are suitable for use in ink jet printing processes such as continuous stream, piezoelectric drop-on-demand, bubble jet or thermal ink jet processes. Generally, the process comprises incorporating an ink of the present invention into an ink jet printing apparatus and causing droplets of the ink to be ejected in an imagewise pattern onto a suitable substrate, thereby generating images on the substrate. Various known ink jet apparatus may be employed to generate images with the ink compositions disclosed herein, such as the DIABLO C150 IJ™ printer, Hewlett Packard DESK JET™ printers, the DIABLO C150 TIJ™ printer, or the like. Particularly preferred is a thermal ink jet printing apparatus. The inks of the present invention can be used to generate images on a wide variety of substrates, including plain paper such as Xerox 4024 paper, bond paper such as GILBERT® 25 percent cotton bond paper or GILBERT® 100 percent cotton bond paper, silica coated papers, transparency materials, fabrics, plastics, polymeric films, and the like.

The following Examples are being submitted to further define various species of the present invention. These Examples are intended to be illustrative only and are not intended to limit the scope of the present invention. Also, parts and percentages are by weight unless otherwise indicated. Comparative Examples are also provided.

EXAMPLE

Step 1—Preparation of Self-emulsifying Sulfonated Polyester

The self-emulsifying sulfonated polyester copoly(1,2 propylene-diethylene)terephthalate-copoly(sodium sulfoisophthalate dicarboxylate) was prepared by a polycondensation process. The polycondensation reactions were accomplished in a modified 5 gallon 4555 Parr Pressure reactor equipped with ½ Hp (1750 rpm) variable speed stirrer motor, a Watlow Series 945 temperature/stirrer controller and a 3 zone ceramic heater unit. A 24 inch Liebeg glass condenser with a 1 liter round bottom catch flask polyester resin was fitted to a 24.29 steel joint welded to the top plate of the reactor. The glass transition temperatures (Tg) was measured on an E.I. DuPont DSC 10 Differential Scanning Calorimeter and the DSC thermograms processed using software supplied with an E. I. DuPont Thermal Analyst 2200 computer. Between 10 to 30 milligrams of the polymer were used for the analysis. Softening points (Ts) were measured using a FP83 Dropping Point heater and processed using a Mettler PP80 processor.

The reactor was charged with 3.492 kilos (17.64 moles, Hoechst Celanese) of dimethylterephthalate and 0.9405 kilos of dimethyl 5-sulfoisophthalate (3.175 moles, DuPont), 2.901 kilos of propylene glycol (38.12 moles, APCO Industries Company Ltd.), 0.449 kilos of diethylene glycol (4.23 moles, APCO Industries Company Ltd.) and 7.2 grams of the transesterification catalyst, Fascat (Elf Atochem). The initial set temperature of the reactor was 90° C., the temperature was increased slowly to 150° C. over a period of 3 hours. Slow stirring (speed 0.43) of the melt was initiated and the reaction temperature increased to 200° C. over a 4 hour period to allow for transesterification. Methanol distillate was first observed at 157° C., and continued until approximately 1,500 milliliters were recovered. An additional 560 milliliters of excess glycol were removed and trapped in a dry ice trap by increasing the temperature slowly to 210° C. and submitting the mixture to a vacuum of about 260 millimeters/Hg. An Edwards Vacuum pump was then attached and the vacuum slowly decreased to 1 millimeter/Hg to remove an additional 337 milliliters of glycols. Vacuum and heat were continued for an additional two hours at the same temperature and a final hour at 215° C. The reactor was then discharged. The self-emulsifying polymer product copoly(1,2 propylene-diethylene) terephthalate-copoly(sodium sulfoisophthalate dicarboxylate) was found to have a glass transition temperature of 54.9° C. and a softening point of 135.1° C. This product containing the sulfonated polyester, copoly(1,2 propylene-diethylene)terephthalate-copoly(sodium sulfoisophthalate dicarboxylate) with 7.5 percent sulfonation, had a $M_w$ of 2,080, a Tg of 54.9° C., and a softening point of 135.1° C. and was used to prepare stable dispersions of Levanyl (available from Bayer) carbon black.

The $M_w$ and $M_n$ recited herein were obtained from a Waters Gel Permeation Chromatograph using tetrahydrofuran as a solvent.3 The glass transition temperatures were obtained from a E.I. Dupont Differential Scanning Calorimeter operating at a heating rate of 10 degree per minute.

Step 2—Preparation of Aqueous Solution from Polymer Obtained in Step 1

An aqueous polyester solution was prepared by slowly adding 10.15 grams of the sulfonated polyester polymer obtained in Step 1 to 118.6 grams of deionized water retained at a temperature of about 80° C. The resulting polymer solution was heated and stirred with a stirring bar at this temperature until the polymer was completely dissolved and the solution appears clear, and for an additional 10 minutes thereafter. The solution was then cooled to room temperature, about 25° C., while continuing the agitation.

Step 3—Preparation of Carbon Black Dispersion from Solution Obtained in Step 2

A carbon black dispersion reference copending application U.S. Ser. No. 08/786,465, the disclosure of which is totally incorporated herein by reference was prepared by adding 91.23 grams of Levanyl A-SF dispersion available from Bayer (carbon black content of 31.8 percent) to the solution obtained from Step 2. Additional deionized water was added to the mixture to obtain 210 grams of a Levanyl/sulfonated polyester dispersion. The dispersion was then mixed further for a period of 15 minutes.

Step 4—Microfluidization of Dispersion Solutions Prepared in Step 3

A modified microfluidizer, model M110F, specially modified with compressed air cooling through an isolator and cooling bath externally mounted around the intensifier pump, was used to further process the carbon black dispersion obtained in Step 3. The dispersion obtained in Step 3 was processed at 11,500 psi. The processing temperature, 80° C., was reached within 5 to 10 minutes with the assistance of an electrical heater attached to the inlet vessel of the microfluidizer. The microfluidizer was operated for an additional 15 minutes while maintaining the temperature of the intensifier cooling bath at a temperature of about minus 10° C. This was achieved by circulating compressed air (30 psi) through the isolator cooling line and by maintaining the externally mounted cooling bath filled with dry ice and isopropyl alcohol. The microfluidizer was then shut off and the resulting carbon black dispersion was discharged from the microfluidizer vessel.

Step 5—Preparation of Carbon Black Inks

The following Examples demonstrate, for example, the advantages of using betaine as an additive to control the smear properties of pigmented inks. In these examples, the amount of carbon black is between 5 and 7 percent by weight, for example, 5% by weight in Example 1, the amount of sulfonated polyester being between 1.5 and 2.1 percent by weight, the ratio of pigment to polyester being 1 part to 0.3 part, the amount of betaine or sulfolane was between 0 and 30 percent by weight, the amount of cosolvent, other than betaine or sulfolane is between 0.42, for example, cyclohexylpyrrolidinone and 1.3 for example, isopropanol and tripropylglycol methyl ether. In Example I, the smear is reduced to 0.11 with the addition of 30 weight percent of betaine. In Examples II to IV different cosolvents were used in the inks but no betaine additive. The smear was greater than 0.5 and as high as 0.9, significantly higher than for the inks containing the bentaine additives of the present invention. In Examples V and VI, it was found that 5 weight percent of betaine was sufficient to reduce the smear to 0.23. In Examples VII, VIII and IX, the amount of betaine was 1, 2 and 3 weight percent respectively.

From a plot graph of percent betaine vs. smear the smear was reduced from above 0.8 to about 0.2 with the addition of 2 percent by weight of betaine based on the total amount of the components in the ink. The addition of larger amounts of betaine, up to 30 percent by weight, further reduced the smear to a value of 0.11.

EXAMPLE I

In this Example, betaine is used with no cosolvent.

An ink was prepared by adding 11.46 grams of the carbon black dispersion prepared as in Steps 1–2 above to 9 g of betaine and 9.54 g of water. The ratio of carbon black to dissipatable polyester in the dispersion was 10 to 3 and the polyester resin sulphonation amount was 7.5 mole percent. The ink was mixed with a magnetic stirrer for a period of about 4 hours. The viscosity of the resulting ink was measured with a Brookfield viscometer LV type with UL adapter, 60 RPM; and the surface tension was measured with a Kruss Surface Tension Meter with a Wilhelmy plate. The viscosity and surface tension of the resulting ink were 2.9 and 52.3 respectively. The ink was printed on an HP1600C thermal ink jet printer by loading it in an HP black cartridge. The images generated on Image Series LX paper were of excellent print quality with an optical density of 1.45 and a dry low excellent smear of 0.11 about 0.5 or less smear is considered acceptable. Optical densities were measured on a MacBeth spectrophotometer and the dry smear on a TMI smear tester.

EXAMPLE II (Comparative)

An ink was prepared by adding 16.04 g of the carbon black sulfonated polyester dispersion prepared as in Steps 1–2 above to 9 g of sulfolane, 0.125 g of cyclohexylpyrrolidinone and 4.835 g of water. The ratio of carbon black to dissipatable polyester in the dispersion was 10 to 3 and the sulphonation level was 7.5 mole percent. The ink was mixed with a magnetic stirrer for a period of about 4 hours and then filtered through a 1 micron glass fiber filter.. The ink was printed on an HP1600C thermal ink jet printer by loading it in an HP black cartridge. The images generated on Image Series LX paper were of excellent print quality with an optical density of 1.37 and a high unacceptable smear of 0.90. Optical densities were measured on a MacBeth spectrophotometer and the dry smear on a TMI smear tester.

EXAMPLE III (Comparative)

An ink was prepared by adding 14.89 g of the carbon black dispersion prepared as in Steps 1–2 above to 9 g of sulfolane, 0.39 g of isopropyl alcohol and 5.72 g of water. The ratio of carbon black to dissipatable polyester in the dispersion was 10 to 3 and the sulphonation level was 7.5 mole percent. The ink was mixed with a magnetic stirrer for a period of about 4 hours and then filtered through a 1 micron glass fiber filter. The ink was printed on an HP1600C thermal ink jet printer by loading it in an HP black cartridge. The images generated on Image Series LX paper were of excellent print quality with an optical density of 1.34 and a high smear of 0.53. Optical densities were measured on a MacBeth spectrophotometer and the dry smear on a TMI smear tester.

EXAMPLE IV (Comparative)

An ink was prepared by adding 14.89 g of the carbon black dispersion prepared as in Steps 1–2 above to 9 g of sulfolane, 0.39 g of tripropylene glycol methyl ether and 5.72 g of water. The ratio of carbon black to dissipatable polyester in the dispersion was 10 to 3 and the sulphonation level was 7.5 mole percent. The ink was mixed with a magnetic stirrer for a period of about 4 hours and then filtered through a 1 micron glass fiber filter.. The ink was printed on an HP1600C thermal ink jet printer by loading it in an HP black cartridge. The images generated on Image Series LX paper were of excellent print quality with an optical density of 1.42 and a high poor unacceptable smear of 0.85. Optical densities were measured on a MacBeth spectrophotometer and the dry smear on a TMI smear tester.

EXAMPLE V

In this Example, the cosolvents are sulfolane, and cyclohexylpyrrolidinone with betaine.

An ink was prepared by adding 16.04 g of a carbon black dispersion prepared as in Step 1–2 above to 9.0 g of sulfolane, 1.5 g of betaine, 0.0147 g of cyclohexylpyrrolidinone and 3.4453 g of water. The ratio of carbon black to dissipatable polyester in the dispersion was 10 to 3 and the sulphonation level was 7.5 mole percent. The ink was mixed with a magnetic stirrer for a period of about 4 hours. The viscosity of the resulting ink was measured with a Brookfield viscometer LV type with UL adapter, 60 RPM; and the surface tension was measured with a Kruss Surface Tension Meter with a Wilhelmy plate. The viscosity and surface tension of the resulting ink were 2.72 and 48.2 respectively. The ink was printed on an HP1600C thermal ink jet printer by loading it in an HP black cartridge. The images generated on Image Series LX paper were of excellent print quality with an optical density of 1.34 and an excellent low smear of 0.23. The ink was also printed on Courtland 4024 DP paper to provide images of optical density of 1.15 and smear of 0.25. Optical densities were measured on a MacBeth Spectrophotometer and the dry smear on a TMI smear tester.

EXAMPLE VI

In this Example, the cosolvents are sulfolane, and cyclohexylpyrrolidinone with betaine.

An ink was prepared by adding 17.19 g of a carbon black dispersion prepared as in Step 1–2 above to 9.0 g of sulfolane, 1.5 g of betaine, 0.0159 g of cyclohexylpyrrolidinone and 2.2941 g of water. The ratio of carbon black to dissipatable polyester in the dispersion was 10 to 3 and the sulphonation level was 7.5 mole percent. The ink was mixed with a magnetic stirrer for a period of about 4 hours. The viscosity of the resulting ink was measured with a Brookfield viscometer LV type with UL adapter, 60 RPM; and the surface tension was measured with a Kruss Surface Tension Meter with a Wilhelmy plate. The viscosity and surface tension of the resulting ink were 3.15 and 43.7 respectively. The ink was printed on an HP1600C thermal ink jet printer by loading it in an HP black cartridge. The images generated on Image Series LX paper were of excellent print quality with an optical density of 1.37 and a low smear of 0.23. The ink was also printed on Courtland 4024 DP paper to provide images of optical density of 1.20 and smear of 0.42. Optical densities were measured on a MacBeth Spectrophotometer and the dry smear on a TMI smear tester.

EXAMPLE VII

In this Example, the cosolvents are sulfolane, cyclohexylpyrrolidinone with betaine and a surfactant with a high HLB value, Surfynol 485 available from Air Products and Chemicals Inc.

An ink was prepared by adding 16.04 g of a carbon black dispersion prepared as in Step 1–2 above to 7.5 g of sulfolane, 0.3 g of betaine, 0.058 g of cyclohexylpyrrolidinone, 0.06 g of Surfynol 485, and 6.042 g of water. The ratio of carbon black to dissipatable polyester in the dispersion was 10 to 3 and the sulphonation level was 7.5 mole percent. The ink was mixed with a magnetic stirrer for a period of about 4 hours. The viscosity of the resulting ink was measured with a Brookfield viscometer LV type with UL adapter, 60 RPM; and the surface tension was measured with a Kruss Surface Tension Meter with a Wilhelmy plate. The viscosity and surface tension of the resulting ink were 2.45 and 45.8 respectively. The ink was printed on an HP1600C thermal ink jet printer by loading it in an HP black cartridge. The images generated on Image Series LX paper were of excellent print quality with an optical density of 1.38 and low smear of 0.78. The ink was also printed on Courtland 4024 DP paper to give images of optical density of 1.21 and a smear of 0.57. Optical densities were measured on a MacBeth Spectrophotometer and the dry smear on a TMI smear tester.

EXAMPLE VIII

In this Example, the cosolvents were sulfolane, cyclohexylpyrrolidinone with betaine and a surfactant with a high HLB value, Surfynol 485 available from Air Products and Chemicals Inc.

An ink was prepared by adding 16.04 g of a carbon black dispersion prepared as in Step 1–2 above to 10.5 g of sulfolane, 0.6 g of betaine, 0.058 g of cyclohexylpyrrolidinone, 0.06 g of Surfynol 485, and 2.742 g of water. The ratio of carbon black to dissipatable polyester in the dispersion was 10 to 3 and the sulphonation level was 7.5 mole percent. The ink was mixed with a magnetic stirrer for a period of about 4 hours. The viscosity of the resulting ink was measured with a Brookfield viscometer LV type with UL adapter, 60 RPM; and the surface tension was measured with a Kruss Surface Tension Meter with a Wilhelmy plate. The viscosity and surface tension of the resulting ink were 2.45 and 45.8 respectively. The ink was printed on an HP1600C thermal ink jet printer by loading it in an HP black cartridge. The images generated on Image Series LX paper were of excellent print quality with an optical density of 1.27 and a low smear of 0.25. The ink was also printed on Courtland 4024 DP paper to give images of optical density of 1.15 and smear of 0.43. Optical densities were measured on a MacBeth Spectrophotometer and the dry smear on a TMI smear tester.

EXAMPLE IX

In this Example, the cosolvents are sulfolane, cyclohexylpyrrolidinone with betaine and a surfactant with a high HLB value, Surfynol 485 available from Air Products and Chemicals Inc.

An ink was prepared by adding 16.04 g of a carbon black dispersion prepared as in Step 1–2 above to 7.5 g of sulfolane, 0.9 g of betaine, 0.058 g of cyclohexylpyrrolidinone, 0.12 g of Surfynol 485, and 5.382 g of water. The ratio of carbon black to dissipatable polyester in the dispersion was 10 to 3 and the sulphonation level was 7.5 mole percent. The ink was mixed with a magnetic stirrer for a period of about 4 hours. The viscosity of the resulting ink was measured with a Brookfield viscometer LV type with UL adapter, 60 RPM; and the surface tension was measured with a Kruss Surface Tension Meter with a Wilhelmy plate. The viscosity and surface tension of the resulting ink were 2.45 and 45.8 respectively. The ink was printed on an HP1600C thermal ink jet printer by loading it in an HP black cartridge. The images generated on Image Series LX paper were of excellent print quality with an optical density of 1.27 and smear of 0.20. The ink was also printed on Courtland 4024 DP paper to provide images of optical density of 1.15 and a low smear of 0.44. Optical densities were measured on a MacBeth Spectrophotometer and the dry smear on a TMI smear tester.

Other modifications of the present invention may occur to those of ordinary skill in the art subsequent to a review of the present application, and these modifications, including equivalents thereof, are intended to be included within the scope of the present invention.

What is claimed is:

1. An aqueous ink composition comprised of dissipatible polymer of a sulfonated polyester or a polyester, colorant, and a zwitterionic component of the formula $R_3N^+(CH_2)_nCOO^-$, where n represents a number of from 1 to 4 and R is a hydrocarbon, and wherein said ink possesses a smear of equal to about or less than about 0.44.

2. An ink in accordance with claim 1 wherein said zwitterionic component is of the formula $R_3N^+(CH_2)_nCOO^-$ wherein n represents the number of methylene segments and R is a hydrocarbon.

3. An ink comprised of water, colorant, dissipatible polymer, and a zwitterionic component of betaine, and wherein said polymer is a polyester, and wherein said ink possesses a smear of equal to about or less than about 0.44.

4. An ink in accordance with claim 3 further containing a polyhydroxyalcohol surfactant.

5. An ink in accordance with claim 4 wherein the polyhydroxyalcohol is a polyethylene glycol tetramethyl decynediol and wherein the polyethylene glycol portion contains about 30 units of ethylene oxide.

6. An ink in accordance with claim 3 wherein the colorant is a pigment, or a dye.

7. An ink in accordance with claim 3 wherein said betaine is present in said ink in an amount of from about 2 to about 35 weight percent.

8. An ink in accordance with claim 3 wherein said betaine is present in said ink in an amount of from about 3 to about 20 weight percent.

9. An ink in accordance with claim 3 wherein said polymer is a sulfonated polyester.

10. An ink in accordance with claim 3 wherein the colorant is present in an amount of about 1 to about 20 percent, the dissipatible polymer is present in an amount of about 0.1 to about 20 percent, and water is present in an amount of from about 96 to about 40 percent by weight based on the total of all ink components.

11. An ink in accordance with claim 3 wherein the colorant is present in an amount of about 1 to about 10 percent and the dissipatible polymer is present in an amount of about 10 to about 50 percent based on the amount of components.

12. An ink in accordance with claim 3 wherein there is further included therein a cosolvent.

13. An ink in accordance with claim 12 wherein the cosolvent is sulfolane.

14. An ink in accordance with claim 2 wherein the polymer is a sulfonated polyester with a sulfonation level, or amount of about 5 to about 20 percent.

15. An ink in accordance with claim 3 wherein the polymer is a sulfonated polyester with a sulfonation amount of about 8 to about 15 percent.

16. An ink in accordance with claim 3 further containing ink additives.

17. An ink in accordance with claim 16 where the additives are a biocide, a humectant, or mixtures thereof.

18. An ink in accordance with claim 17 wherein each additive is selected in an amount of from about 1 to about 5 weight percent based on the total amount of the components in the ink.

19. An ink in accordance with claim 3 wherein the colorant is a pigment of carbon black.

20. An ink in accordance with claim 3 wherein said polymer is a sulfopolyester oligomer with a weight average molecular weight of from about 1,000 to about 10,000.

21. An ink in accordance with claim 3 wherein said polymer is the sulfopolyester copoly(1,2-propylene-diethylene)terephthalate-copoly(sodium sulfoisophthalate) dicarboxylate.

22. A printing process which comprises (1) incorporating into an ink jet printing apparatus the ink composition of claim 3 and (2) causing droplets of the ink to be ejected in an image wise pattern onto a substrate, thereby generating images on the substrate.

23. A printing process in accordance with claim 22 wherein the ink jet printing apparatus employs a thermal ink jet printing process, and wherein there are provided prints on paper with solid area coverage with an optical density of from about 5 to about 1.5, and wherein the prints possess a waterfastness of from about 80 percent to about 99 percent and which prints possess minimum curl and minimal smear.

24. A process for reducing image smearing and minimizing paper curl in an ink jet printing apparatus which process comprises selecting an ink containing a dissipatible polymer of a sulfonated polyester or a polyester and betaine and wherein said ink possesses a smear of equal to about or less than about 0.44.

25. An ink comprised of colorant, a dissipatible polyester polymer, of a sulfonated polyester or a polyester and a zwitterionic component of the formula $$R_3N^+(CH_2)_nCOO^-$$

wherein n represents the number of methylene segments and is a number of from 1 to 4 and R is a hydrocarbon and wherein said ink possesses a smear of equal to about or less than about 0.44.

26. An ink in accordance with claim 25 wherein the ink further contains water.

27. An ink in accordance with claim 25 wherein n is a number of from 1 to 4.

28. An ink in accordance with claim 25 wherein said hydrocarbon contains from 1 to about 20 carbon atoms.

29. An ink in accordance with claim 28 wherein said zwitterionic compound is betaine.

30. An ink in accordance with claim 25 wherein said zwitterionic compound is comprised of the inner salts of ethanaminium, 2-carboxy-N,N-diethyl-N-methyl—, of 1-propanaminium, 3-carboxy-N,N,N-trimethyl—, of 1-butanaminium, 4-carboxy-N,N,N-trimethyl—, 1-propanaminium, 3-carboxy-N,N-diethyl-N-methyl—, of methanaminium, 1-carboxy-N,N-dimethyl-N-trifluoromethyl, or of methanaminium, 1-carboxy-N,N-dimethyl-N-(ethylene oxide).

31. An ink in accordance with claim 25 wherein said polyester is a sulfopolyester.

32. An ink in accordance with claim 31 wherein said sulfopolyester is copoly(1,2-propylene-diethylene) terephthalate-copoly(sodium sulfoisophthalate) dicarboxylate.

* * * * *